(12) United States Patent
Murphey et al.

(10) Patent No.: US 8,770,522 B1
(45) Date of Patent: Jul. 8, 2014

(54) DEPLOYABLE SPACE BOOM USING BI-STABLE TAPE SPRING MECHANISM

(75) Inventors: Thomas W. Murphey, Albuquerque, NM (US); Gregory E. Sanford, Albuquerque, NM (US); Sungeun Jeon, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 400 days.

(21) Appl. No.: 12/957,495

(22) Filed: Dec. 1, 2010

(51) Int. Cl.
*B64G 1/22* (2006.01)
*B64G 1/00* (2006.01)

(52) U.S. Cl.
USPC .......... 244/172.6; 244/159.4; 52/108; 52/632

(58) Field of Classification Search
USPC .......... 244/158.2, 171.7, 171.8, 172.6, 172.9, 244/173.1, 173.3, 110 C; 410/103; 242/538, 242/538.1, 538.2, 538.3, 378; 52/108
See application file for complete search history.

(56) References Cited

U.S. PATENT DOCUMENTS

| | | | | |
|---|---|---|---|---|
| 2,799,368 | A * | 7/1957 | Alter ................................ | 52/108 |
| 3,862,528 | A * | 1/1975 | Meissinger ..................... | 52/108 |
| 6,217,975 | B1 | 4/2001 | Daton-Lovett | |
| 6,843,029 | B2 * | 1/2005 | Breitbach et al. ............... | 52/108 |
| 7,104,491 | B2 * | 9/2006 | Vinding ..................... | 242/378.4 |
| 7,523,883 | B2 * | 4/2009 | Cheng ........................... | 242/378 |
| 2002/0196707 | A1 * | 12/2002 | Kitchin et al. .................... | 367/4 |
| 2006/0207189 | A1 * | 9/2006 | Pryor et al. ......................... | 52/1 |
| 2010/0327099 | A1 * | 12/2010 | Kuo ............................... | 242/378 |

OTHER PUBLICATIONS

E. Kebadze, S. Guest and S. Pellegrion, "Bistable prestressed shell structures," International Journal of Solids and Structures, 41 (2004) 2801-2820.
T. Murphey et al, "A Novel Actuated Composite Tape-Spring for Deployable Structures," Proc. of the 45th AIAA/ASME/ASCE/AHS/ASC Structures, Dynamics and Materials Conf. 2004.
Stem, Herzl, NASA SP-8065-1.

* cited by examiner

*Primary Examiner* — Rob Swiatek
*Assistant Examiner* — George Andonyan
(74) *Attorney, Agent, or Firm* — James M. Skorich; Kenneth E. Callahan (57) ABSTRACT

A spacecraft deployment mechanism employing a pair of bi-stable tape springs attached to a cylinder such that rotation of the cylinder extends or retracts the tape springs in opposite directions. The tape springs are fabricated such that they are stable when wrapped around a cylinder (stowed configuration) or when deployed and have a higher energy state when stowed than when deployed. A plurality of bi-stable tape spring mechanisms may be combined to create a deployment device that does not impart rotational torques to the spacecraft during deployment. Deployment may be accomplished by release of the stored energy in the coiled or packaged state progressing to the lower energy deployed state. Alternatively, a motor may be employed to rotate the cylinders for deploy or retrace the tape springs.

4 Claims, 9 Drawing Sheets

3-Beam Deployment Device
Partial Deployment - Oblique View

3-Beam Deployment Mechanism - Exploded View

3-Beam Deployment Device
Stowed Configuration - Oblique View

Fig. 6A

Side View

Fig. 6B

Top View

Fig. 6C

3-Beam Deployment Device
Partial Deployment - Oblique View

Fig. 7A

Side Veiw

Fig. 7B

Top View

Fig. 7C

4-Beam Deployment Device
Partial Deployment - Oblique View

Fig. 9A

Side View

Fig. 9B

Top View

Fig. 9C

DEPLOYABLE SPACE BOOM USING BI-STABLE TAPE SPRING MECHANISM

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

During launch, satellites are subjected to acceleration loads many times the acceleration due to gravity. This acceleration creates large loads on any spacecraft components not uniformly supported by the launch vehicle. To mitigate these loads and to better allow systems to fit within launch vehicle fairings, deployable structures are used to allow the compact packaging of otherwise large spacecraft components. For example, spacecraft solar arrays are often made deployable so that during launch they are well supported near the system bus. After launch, the array panels are deployed to lengths spanning many times the original bus dimensions. Additional applications of deployable structures in space are gravity gradient booms, instrument booms and various antennas for communications and radar missions.

The Storable Tubular Extendible Mast (STEM, Herzl, NASA SP-8065-1) is an example of a deployable structure. This structure uses a complex reel mechanism (canister) to store a highly stressed metal ribbon that once deployed, overlaps itself and forms a tube. Several variations of the STEM are commercially available from Northrop Grumman (Astro Aerospace). In a typical embodiment of STEM architectures, the tubes deploy from a canister that is fixed to the spacecraft. In U.S. Pat. No. 4,018,397, several tubes deploy from a single canister. The current invention improves upon these by configuring the booms in a new way such that the deployment control mechanism and canister are greatly simplified.

SUMMARY OF THE INVENTION

A deployable elastic boom comprised of multiple tape-spring elements is disclosed. When the tapes-springs are fabricated in bi-stable configurations (either due to pre-stress or material orthotropy), only a guide mechanism is required to ensure the linear kinematics of deployment. The tape-spring boom can be deployed either freely (without rate control) or with rate control devices.

BRIEF DESCRIPTION OF THE DRAWINGS

FIG. 2 shows an exploded view of the deployment mechanism for the 2-beam design (2A) and an expanded view of the mechanism (2B).

FIG. 3 shows three views of the 2-beam deployment device in the stowed configuration: oblique view (3A), side view (3B), and top view (3C).

FIG. 4 shows three views of the 2-beam deployment device in a partially deployed configuration: oblique view (4A), side view (4B), and top view (4C).

FIG. 6 shows three views of the 3-beam device in the stowed configuration: oblique view (6A), side view (6B), and top view (6C).

FIG. 7 shows three views of the 3-beam device in a partially deployed configuration: oblique view (7A), side view (7B), and top view (7C).

FIG. 9 shows three views of the 4-beam deployment device in a partially deployed configuration: oblique view (9A), side view (9B), and top view (9C).

DESCRIPTION OF THE PREFERRED EMBODIMENT

A tape spring is a thin elastic shell in the form of a portion of a cylindrical surface with an arbitrary length, radius, and cross-sectional angle that can be flattened at one end and rolled up. A steel tape measure is an example in which the cross-sectional angle is normally 50 to 70 degrees. The rolled up or packaged state of a steel tape measure typically contains a significant amount of bending strain energy. It is not in equilibrium and requires the application of external forces and a containment mechanism to prevent unrolling.

In the present invention a key feature of the tape springs is that they are bi-stable. This means that the tape-springs are stable in either the fully rolled (packaged or stowed state) or fully unrolled (deployed) configurations. Intermediate configurations tend to smoothly reconfigure towards the lowest energy state configuration through a rolling motion. The release of energy during this progression from a higher energy state to a lower energy state powers the deployment. In this invention, the tape springs are fabricated such that the deployed configuration is in a lower energy state than the stowed configuration.

Bi-stability in tape-spring has been achieved using two approaches. In the first approach, internal stresses are used to achieve bi-stability. This approach can be used with isotropic materials and is employed by the toy commonly known as a "slap bracelet." The structural mechanics of this approach are explained in E. Kebadze, S. Guest and S. Pellegrino, "Bistable prestressed shell structures," International Journal of Solids and Structures, 41 (2004) 2801-2820. A steel slap bracelet has two stable configurations. The extended state represents a stable high energy state. If any cross-section of the extended tape spring is flattened, it jumps to a coiled configuration, the second stable configuration.

Pre-stress can also be used with orthotropic laminated composite materials to achieve bi-stability as explained in T. Murphey and S. Pellegrino, "A Novel Actuated Composite Tape-Spring for Deployable Structures," Proceedings of the 45$^{th}$ AIAA/ASME/ASCE/AHS/ASC Structures, Dynamics and Materials Conference, April 2004, AIAA-1528-2004. Here a fiber reinforced plastic composite neutrally stable tape-spring is constructed from a cross-ply laminate where each lamina individually has a curvature pre-stress. The two curved lamina with perpendicular curvature axes and opposing curvature senses are bonded together in a flat configuration. The resulting tape spring is stable when fully rolled or completely unrolled and is neutrally stable in transition configurations.

Bi-stability can also be achieved simply through material orthotropy. This approach is disclosed in "Extendible Member," Andrew Daton-Lovett, U.S. Pat. No. 6,217,975, hereby incorporated by reference. The tape spring in this approach is comprised of a layer having a bias towards the deployed state attached to a layer having longitudinally extending fibers which give the second layer a bias toward the coiled state, thereby providing bi-stability.

Figure 1:
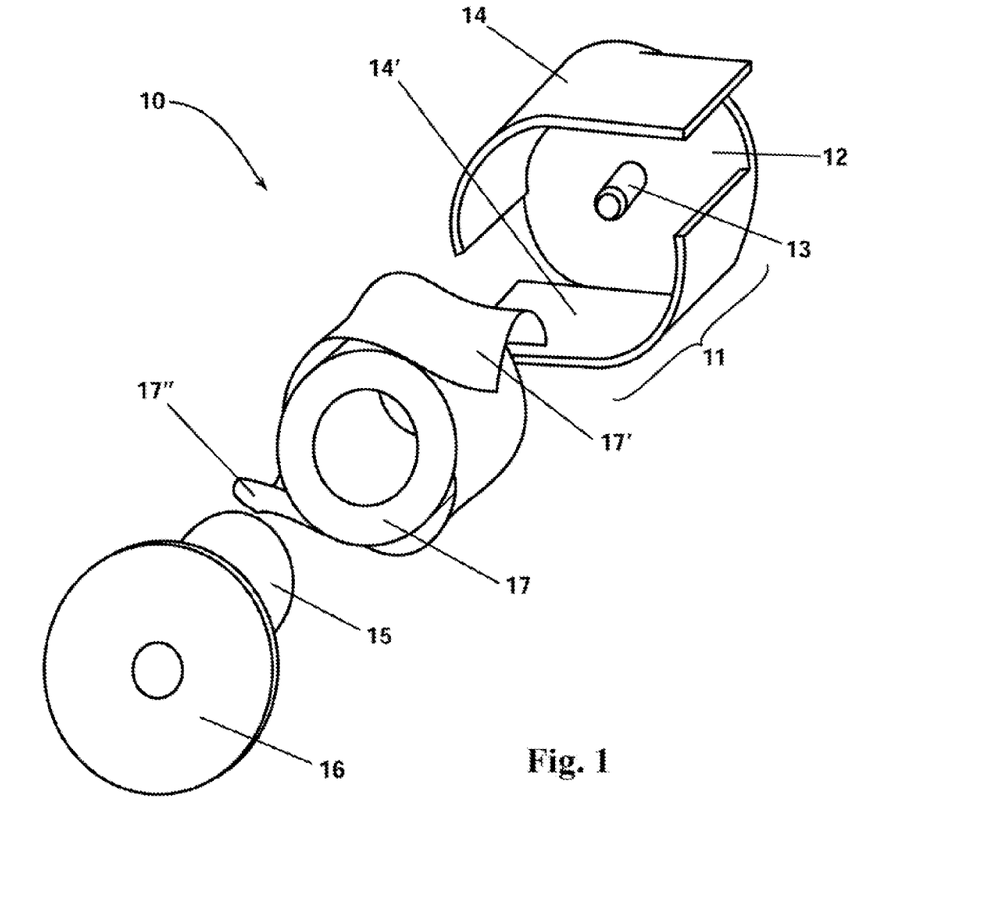
FIG. 1 is an exploded view of the basic bi-stable tape spring deployment device.

FIG. 1 is an exploded view of the basic bi-stable tape spring deployment mechanism 10. The shroud 11 is comprised of a center plate 12 with a shaft 13 located at the center of the plate 12 and extending outward from the front of the plate 12 perpendicular to the plane of the plate 12. A pair of guide flanges 14/14' is attached to the outer edge of the front (shaft side) of the plate 12. The back side of the plate 12 for this embodiment has no protruding shaft. Next there is a hub cylinder 15 with a hub cap 16 attached to one end. The opposite end of the cylinder 15 is attached to the shaft 13 such that it can rotate relative to the shroud 11. A bi-stable tape spring 17 is held within the shroud 11 between the back side of the plate 12 and the center plate 12 once they are assembled together. When assembled, the shaft 13 is received by the hub cylinder 15, thereby enclosing the bi-stable tape spring 17 within the shroud 11. During use, a first end 17' of a first bi-stable tape spring 17 can be attached to a first spacecraft component (not shown) and the opposite end 17" can be attached to a second spacecraft component (not shown) to be deployed. The tape spring 17 is fabricated to be stable when wrapped around the hub cylinder 15 in a stowed configuration (high energy state) and when fully extended by the tape spring's ends 17'/17" in a deployed configuration (low energy state). Rotation of the hub cylinder 15 in a first direction (clockwise as drawn in FIG. 1) causes the two tape spring ends 17'/17" to extend outwardly in opposite directions guided by the flanges 14/14". An opposite rotation of the hub cylinder 15 causes the two tape springs end 17'/17" to retract and wrap around the hub cylinder 15. Some means can be provided, such as a small motor or spring and release device (not shown), for initiating the rotation of the hub cylinder 15 while in the stowed configuration. Once initiated, the deployment of the tape spring 17 is powered by the release of energy during the progression from a higher energy state to a lower energy state. A damping mechanism (not shown) may be used to control the deployment rate. A motor means (not shown) may be used to control the deployment rate. A motor means (not shown) may be used to rotate the cylinder 15 at a desired rate throughout deployment or to retract the tape springs end 17'/17".

Figures 2A, 2B:
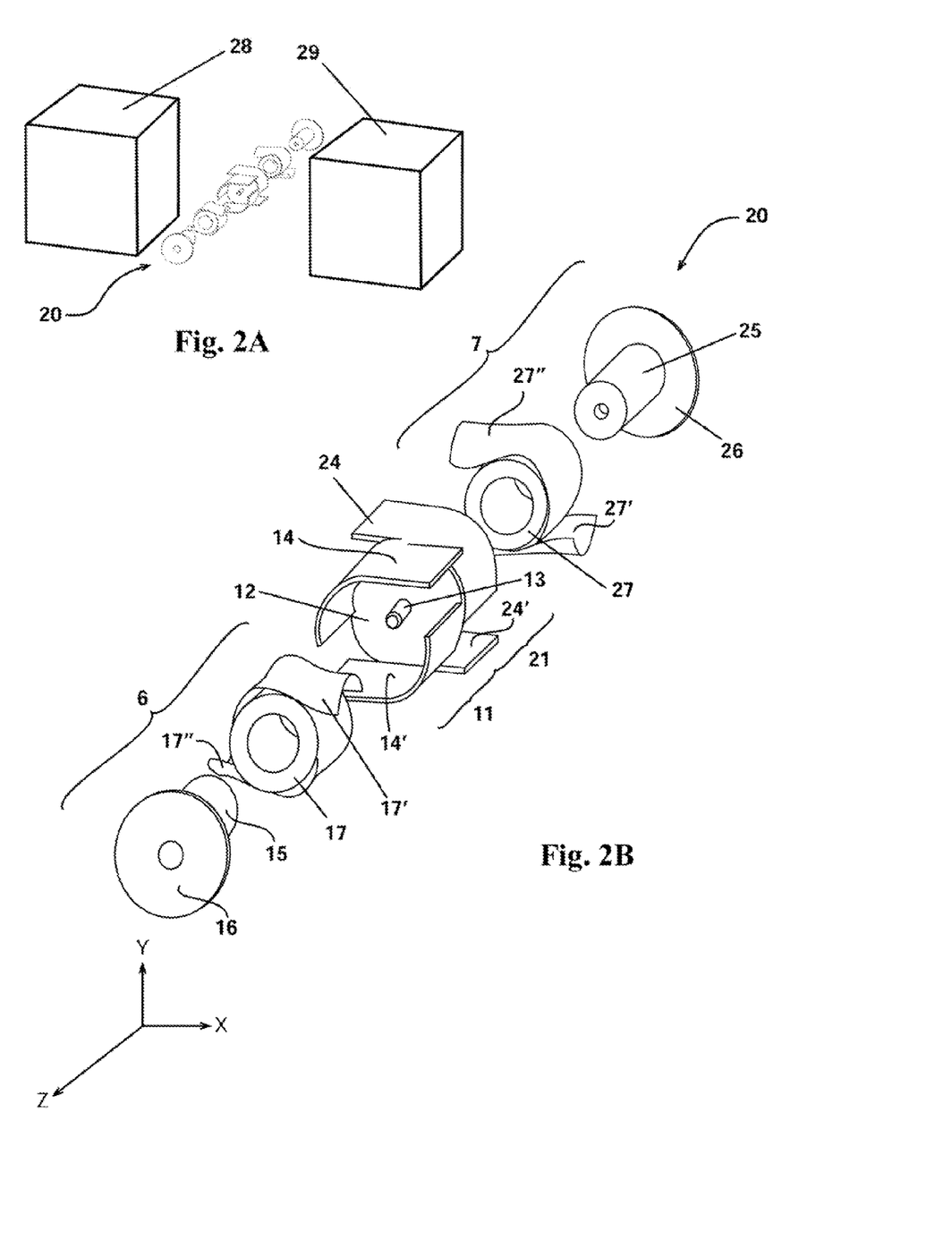
Figure 3A:
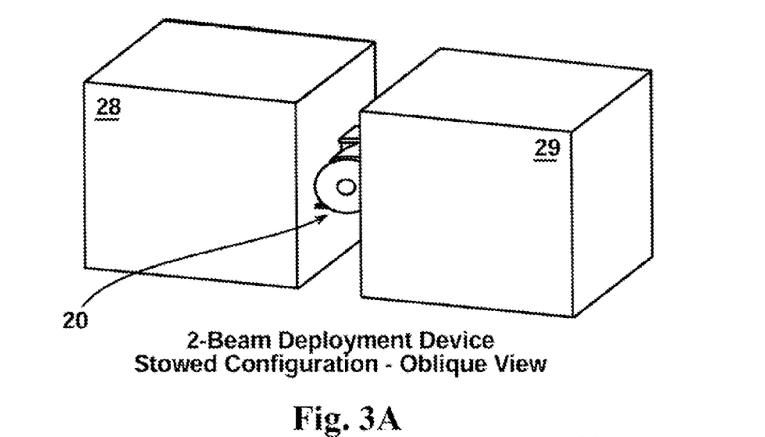
Figure 3B:
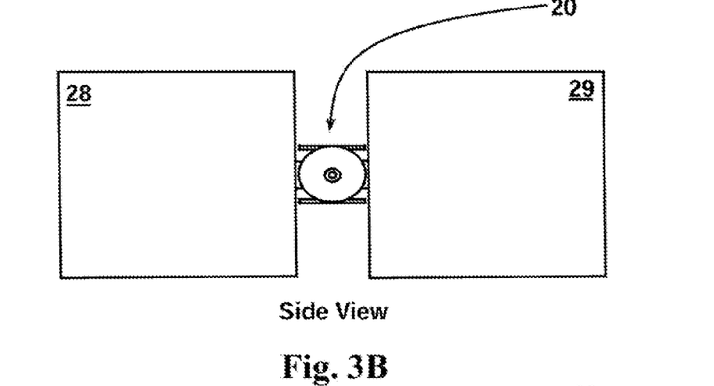
Figure 3C:
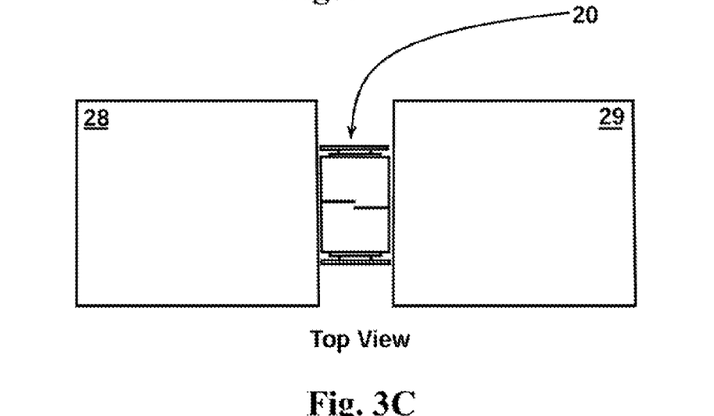
Figure 4A:
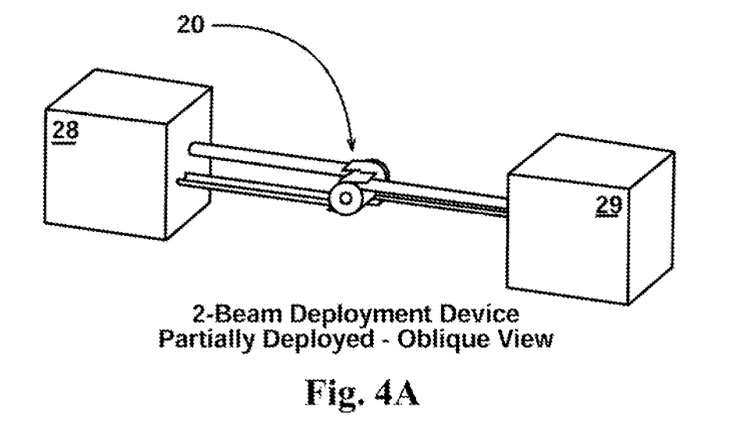
Figure 4B:
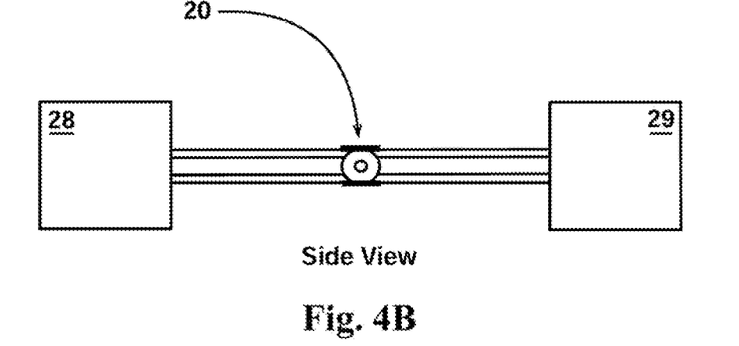
Figure 4C:
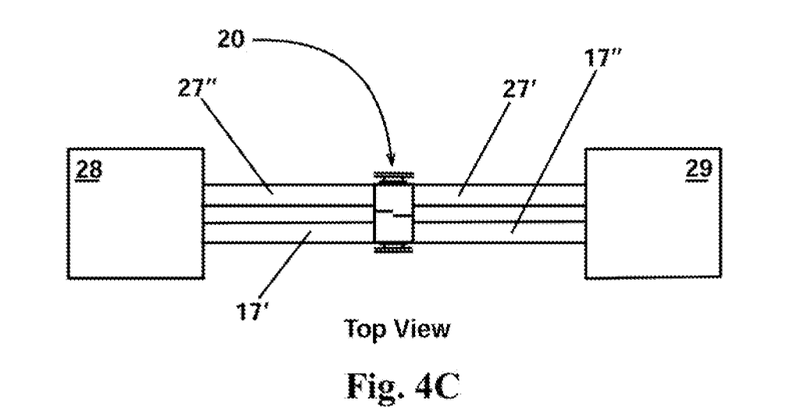

FIG. 2A shows an exploded view of 2-beam deployment device 20 that can be used to secure two objects 28/29. FIG. 2B shows an expanded view of the 2-beam deployment mechanism 20. The back side of a first bi-stable tape spring mechanism 6 is attached to the back side of a second bi-stable tape spring mechanism 7 such that a rotation of the first tape spring mechanism 6 combined with a simultaneous counter rotation of the second tape spring mechanism 7 causes the tape spring pairs 17'/17" and 27'/27" of each mechanism 67 to extend outwardly in opposite directions going from a stowed to a deployed configuration once rotation of the hub cylinders 15/25 is initiated. The counter rotation of the two tape spring mechanisms 6/7 cancels any rotational torques during deployment that may disturb the spacecraft's attitude. Again, a damping mechanism may be used to control the deployment rate. A motor means may be used to rotate the cylinders at a desired rate throughout deployment or to retract the tape springs 17/27. FIGS. 3 and 4 show three views of the 2-beam deployment device in the stowed (FIG. 3) and partially deployed (FIG. 4) configurations.

Figure 5:
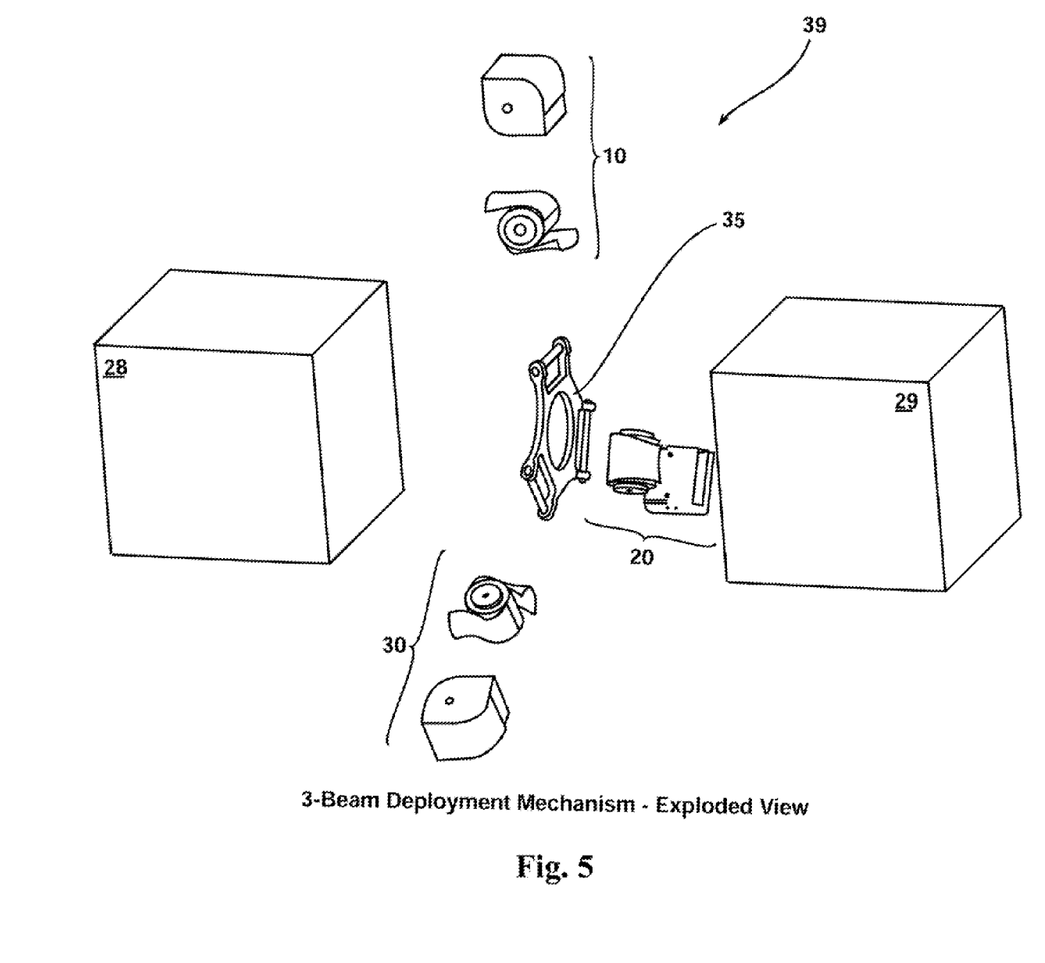
FIG. 5 shows an exploded view of a 3-beam deployment device with three tape spring mechanisms attached.
Figure 6A:
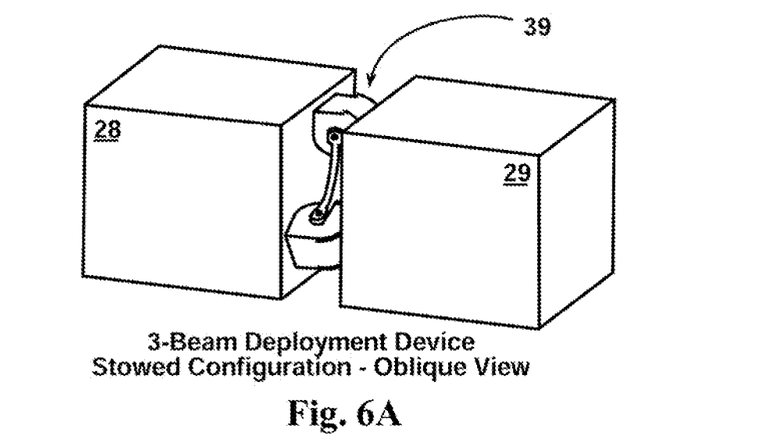
Figure 6B:
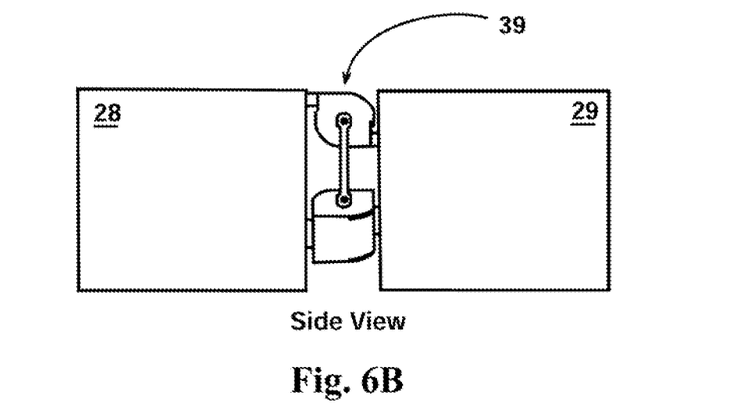
Figure 6C:
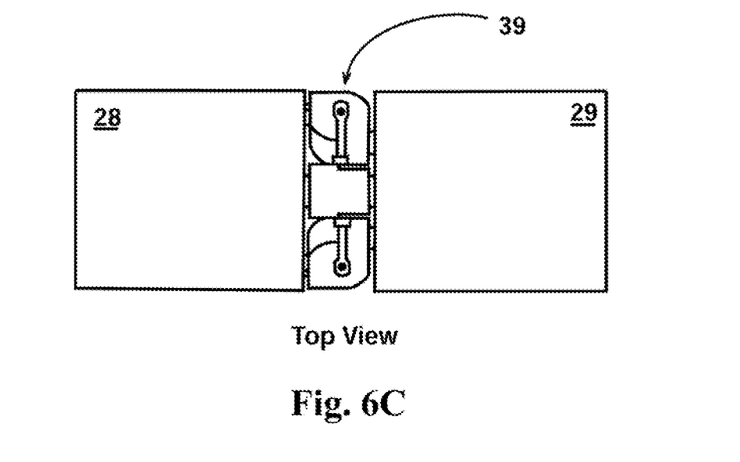
Figure 7A:
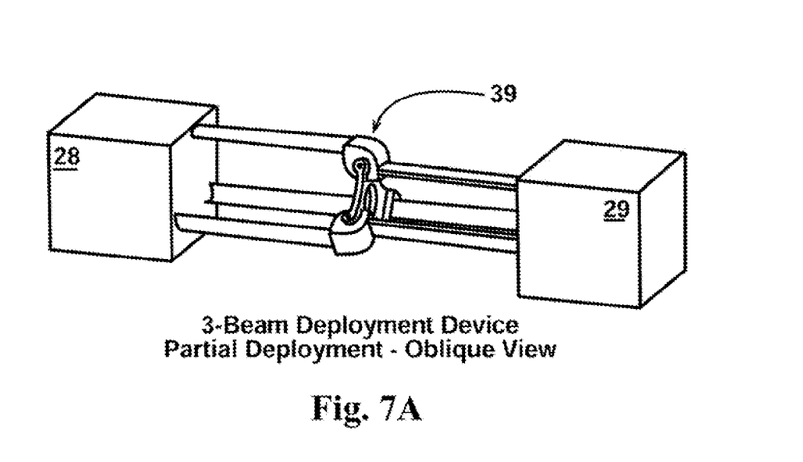
Figure 7B:
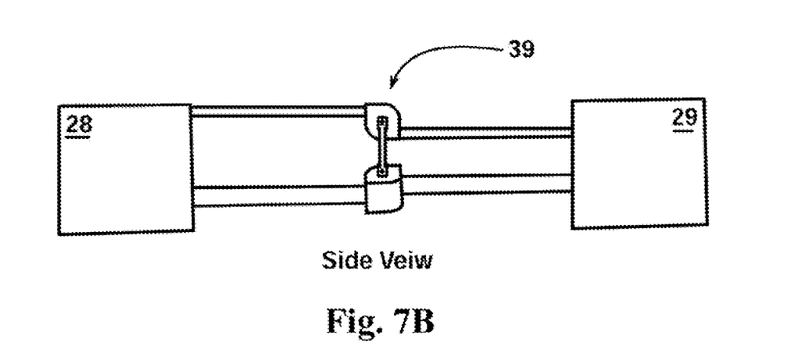
Figure 7C:
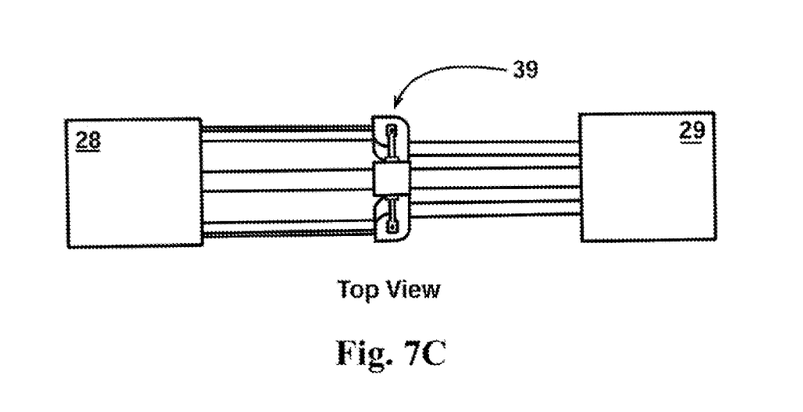

FIG. 5 shows an exploded view of a 3-beam deployment device 39 with a central structure 35 located in a common plane perpendicular the tape spring deployment directions. The central structure 35 holds three bi-stable tape spring mechanisms 10/20/30 arranged along a ring formed by the central structure 35 and equally spaced apart. The hub cylinders' axes of rotation are along the tangent to the ring and all three rotate in the same direction for either deployment or retraction. This arrangement cancels out the rotational forces on the overall spacecraft during deployment. This is the case for any odd number of tape spring mechanisms. FIG. 6 shows three views of this mechanism in a stowed configuration. FIG. 7 shows three partially deployed views of the FIG. 5 mechanism.

Figure 8:
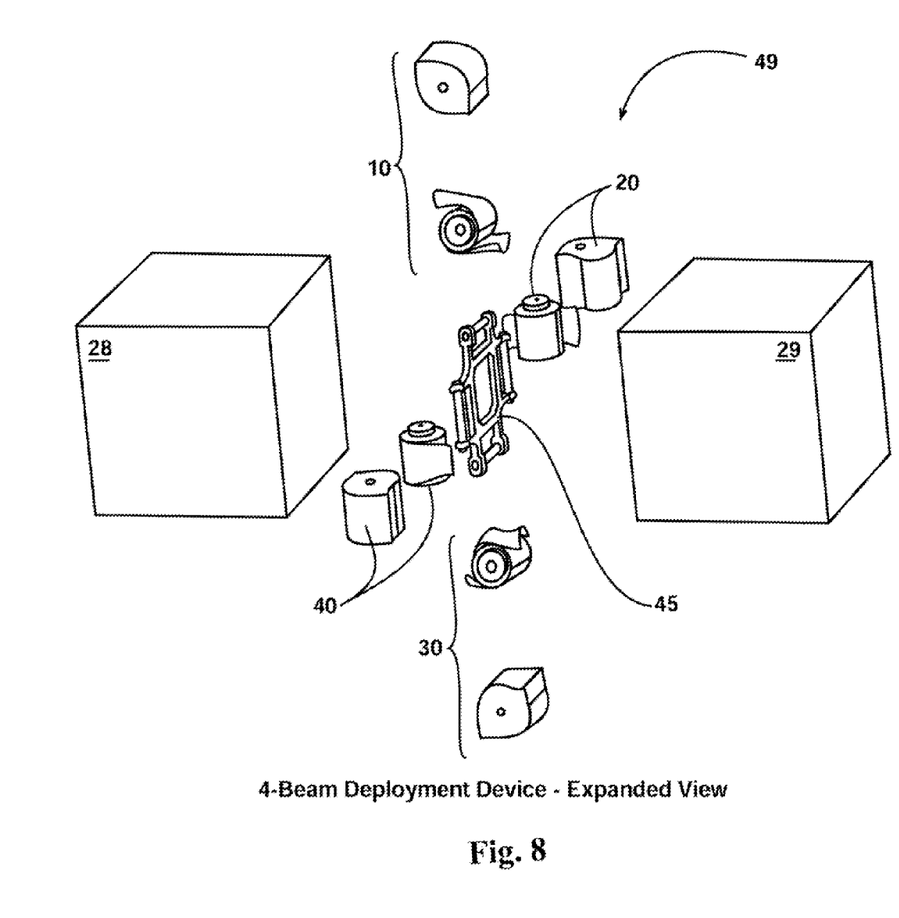
FIG. 8 shows an exploded view of a 4-beam deployment device with four tape spring mechanisms attached.
Figure 9A:
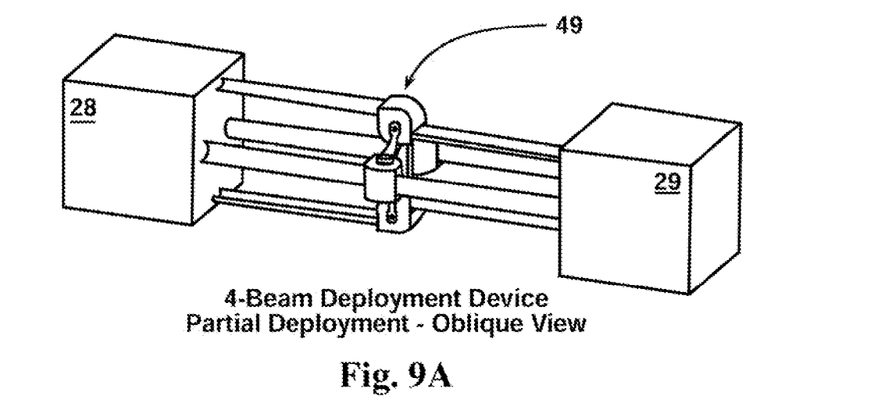
Figure 9B:
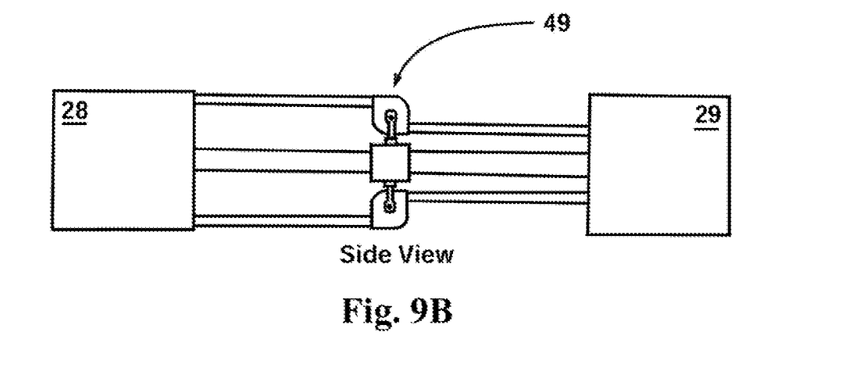
Figure 9C:
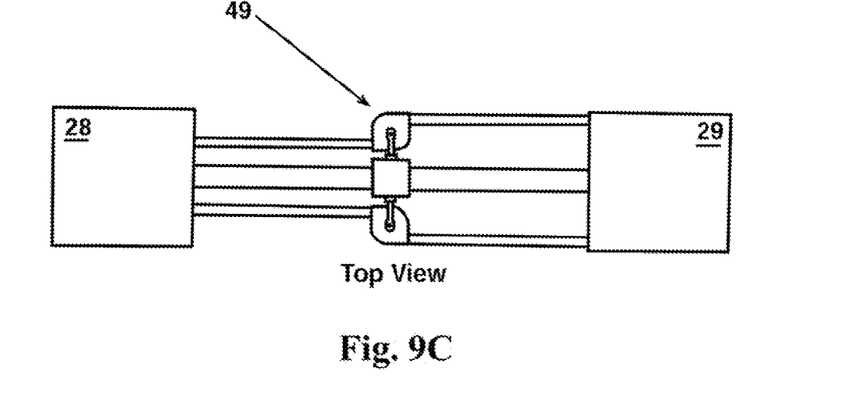

FIG. 8 shows an exploded view of a 4-beam deployment device 49 with a central structure 45 located in a common plane perpendicular the tape spring deployment directions. The four bi-stable tape spring mechanisms 10/20/30/40 are located 90 degrees apart on a ring formed by and around the center of the structure 45 with the hub cylinders' axes of rotation being along the tangent to the ring. Opposite tape spring mechanisms counter rotate with respect to each other to null out any torques during deployments. FIG. 9 shows three partially deployed views of the FIG. 8 deployment device 49. The opposite tape spring mechanisms could also be placed on circles of different radii with the same center point.

The invention claimed is:

1. A three-beam mechanism for the deployment of components on a spacecraft employing three bi-stable tape spring mechanisms, said three-beam deployment mechanism comprised of:
   a. first, second, and third essentially identical bi-stable tape spring mechanisms;
   b. a planar central structure having a center and an outer circular ring with said three tape spring mechanisms attached to said outer ring, such that they are equally spaced about said ring, have their hub cylinder axes of rotation tangent to said ring, and all rotate in the same direction for deployment, whereby rotational forces acting on the spacecraft are essentially canceled out during deployment and retraction employing said three-beam mechanism;
   c. each of said bi-stable tape spring mechanisms including a tape spring having two ends which extend centrifugally from said center in opposite directions when deployed and moves centripetally towards said center when being retracted into a stowed configuration around a hub cylinder; and
   d. means for simultaneously initiating the rotations of said tape spring mechanisms while in the stowed configuration whereby the deployment thereafter by said tape spring mechanisms is powered by the release of energy during the progression from a higher energy state to a lower energy state of the tape springs and the torque imparted to the spacecraft is essentially canceled out.

2. The three-beam spacecraft deployment mechanism of claim 1, wherein motor means for rotating said tape spring mechanisms is employed to thereby deploy or retract the attached spacecraft components at a desired rate.

3. A four-beam mechanism for the deployment of components on a spacecraft employing four bi-stable tape spring mechanisms, said four-beam deployment mechanism comprised of:
   a. four essentially identical bi-stable tape spring mechanisms;
   b. a planar central structure having a center and an outer circular ring with said four tape spring mechanisms attached to said outer ring, such that they are equally spaced about said ring, have their hub cylinder axes of rotation tangent to said ring, and opposite tape spring mechanisms counter rotate for deployment, whereby rotational forces acting on the spacecraft are essentially canceled out during deployment and retraction employing said four-beam mechanism;

c. each of said bi-stable tape spring mechanisms including a tape spring having two ends which extend centrifugally from said center in opposite directions when deployed and moves centripetally towards said center when being retracted into a stowed configuration around a hub cylinder; and d. means for simultaneously initiating the rotations of said tape spring mechanisms while in the stowed configuration whereby the deployment thereafter by said tape spring mechanisms is powered by the release of energy during the progression from a higher energy state to a lower energy state of the tape springs and the torque imparted to the spacecraft is essentially canceled out.

4. The four-beam spacecraft deployment mechanism of claim 3, wherein motor means for rotating said tape spring mechanisms is employed to thereby deploy or retract the attached spacecraft components at a desired rate.

* * * * *